United States Patent [19]

Gill et al.

[11] Patent Number: 4,780,801

[45] Date of Patent: Oct. 25, 1988

[54] UNINTERRUPTIBLE POWER SUPPLY APPARATUS

[75] Inventors: Frank H. Gill, Dallas, Tex.; Alexander J. Severinsky, Silver Spring, Md.

[73] Assignee: M-Power, Inc., Dallas, Tex.

[21] Appl. No.: 3,639

[22] Filed: Jan. 15, 1987

[51] Int. Cl.[4] .................. H02M 7/515; H02J 9/00
[52] U.S. Cl. ..................... 363/25; 363/133; 307/64; 307/65
[58] Field of Search ................ 363/22–26, 363/133, 139, 41; 307/64–66

[56] References Cited

U.S. PATENT DOCUMENTS

| | | | |
|---|---|---|---|
| 3,742,330 | 6/1973 | Hodges et al. | 363/41 |
| 3,768,000 | 10/1973 | Bates | 363/43 X |
| 3,916,286 | 10/1975 | Waehner | 363/25 |
| 4,395,639 | 7/1983 | Bring | 307/66 |

Primary Examiner—Patrick R. Salce
Assistant Examiner—Emanuel Todd Voeltz
Attorney, Agent, or Firm—Kanz, Scherback & Timmons

[57] ABSTRACT

Uninterruptible power supply apparatus which provides for supplying ac power to equipment even if and when the primary ac power is interrupted is disclosed and comprises an ac to dc converter connected to receive the primary ac power. The output of the ac to dc converter is applied to a dc power source. The resultant output of the ac to dc converter and the dc power source is provided as a dc input to a dc to ac inverter. The dc to ac inverter comprises an output transformer having a center-tapped primary. A first switching device is connected between a first end of the center-tapped primary and the negative terminal of the dc input to provide power pulses to one-half of the center-tapped primary. A second switching device is connected between a second end of the center-tapped primary and the negative terminal of the dc input to provide power pulses to the remaining half of the center-tapped primary. A third switching device is connected across the first and second ends of the center-tapped primary by first and second rectifier devices to provide a short across a predetermined half of the center-tapped primary. The center tap of the center-tapped primary is connected to the positive terminal of the dc input. A filter is connected between the center-tapped primary and the first and second switching devices to smooth the power pulses into a sine wave. A control device provides control signals to the dc to ac converter to control the turn-on and turn-off of the first, second and third switching devices.

18 Claims, 3 Drawing Sheets

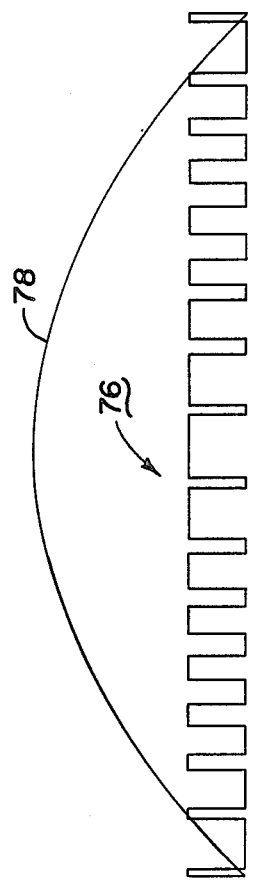
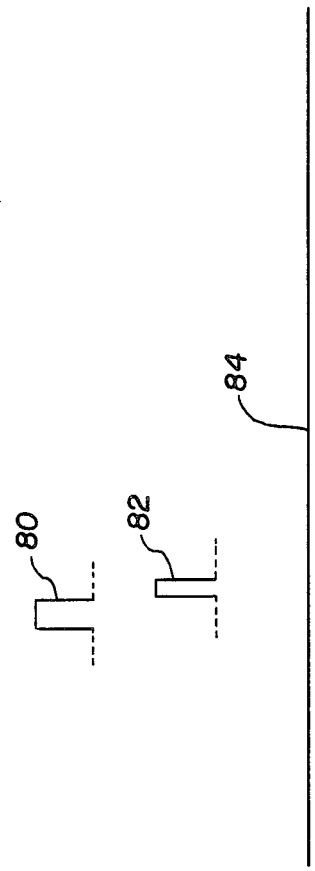
Fig. 3
Fig. 4

UNINTERRUPTIBLE POWER SUPPLY APPARATUS

BACKGROUND OF THE INVENTION

1. Field of the Invention

The present invention relates in general to a new and improved uninterruptible power supply apparatus. More particularly, it relates to a new and improved dc to ac inverter portion in said uninterruptible power supply.

2. Description of the Prior Art

Various backup, standby or emergency power systems have been known and used in the past. These prior art units were used to supply power in various areas when the commercial ac power supplied by the utility company was interrupted momentarily or was cut off for a greater length of time. Some of these prior art systems require a certain length of transfer time when they were required to supply the needed power in the emergency. These systems would sense the failure of the commercial ac power and would then transfer the emergency power system to take the place of the commercial ac power. The transfer or substitution of the backup system could result in a discontinuity in the supply of ac power. This transfer time and discontinuity of available ac power was not detrimental in the majority of applications.

With the advent of the computer and microprocessor-based equipment together with the programs and data associated therewith, it was necessary to provide continuous and uninterrupted power to such equipment. The transfer time, discontinuity and power anomalies associated with supplying power to computer and microprocessor-based equipment could no longer be tolerated because of the possible time and money which could be lost with the loss of data, damage to equipment, etc.

The present invention provides an uninterruptible power supply which eliminates many of the prior art deficiencies in systems which are the forward transfer or standby systems. Many prior art systems have complicated electronic systems which render the systems expensive and of somewhat suspect reliability. Many of the prior art systems do not use state-of-the-art circuitry. Power anomalies are sometimes allowed to affect the equipment being supplied power. Many prior art systems are difficult and expensive to repair.

SUMMARY OF THE INVENTION

The present invention provides an uninterruptible power supply for supplying ac power to equipment even if and when the primary or utility ac power is interrupted and comprises an ac to dc converter connected to receive the primary or utility ac power. The output of the ac to dc converter is applied to a dc power source. The resultant output of the ac to dc converter and the dc power source is provided as a dc input to a dc to ac inverter. The dc to ac inverter comprises an output transformer having a center-tapped primary. A first switching means is connected between a first end of the center-tapped primary and the negative terminal of the dc input to provide power pulses to one-half of the center-tapped primary. A second switching means is connected between a second end of the center-tapped primary and the negative terminal of the dc input to provide power pulses to the remaining half of the center-tapped primary. A third switching means is connected across the first and second ends of the center-tapped primary by first and second rectifier means to provide a short across a predetermined half of the center-tapped primary. Means connect the center tap of the center-tapped primary to the positive terminal of the dc input. Filter means are connected between the transformer's center-tapped primary and the first and second switching means to smooth the power pulses into one-half of a sine wave. A control means provides control signals to the dc to ac inverter to control the turn-on and turn-off of the first, second and third switching means. The control signals are substantially square wave pulses of predetermined varying widths.

Among the advantages offered by the present invention is an uninterruptible ac power supply even if and when the primary or utility power is interrupted. The apparatus does not allow any primary or utility ac power anomalies to affect the equipment being supplied power by the present invention. The apparatus provides means for maintaining the ac power output thereof constant even when the dc input to the apparatus decreases. The apparatus provides means for maintaining the ac power output thereof constant even when the current drawn therefrom by the equipment load varies.

Examples of the more important features and advantages of this invention have thus been summarized rather broadly in order that the detailed description thereof that follows may be better understood and in order that the contribution to the art may be better appreciated. There are, of course, additional features of the invention which will be described hereinafter and which will also form the subject of the claims appended hereto. Other features of the present invention will become apparent with reference to the following detailed description of a presently preferred embodiment thereof in connection with the accompanying drawing in which:

BRIEF DESCRIPTION OF THE DRAWING

FIG. 3 is a simplified representation of the waveform of the energy applied to the primary winding of the center-tapped transformer of the dc to ac inverter of the present, invention; and FIG. 4 is a simplified representation of the waveform of the signal applied to one of the switching means of the dc to ac inverter of the present invention.

DESCRIPTION OF THE PREFERRED EMBODIMENT

Figure 1:
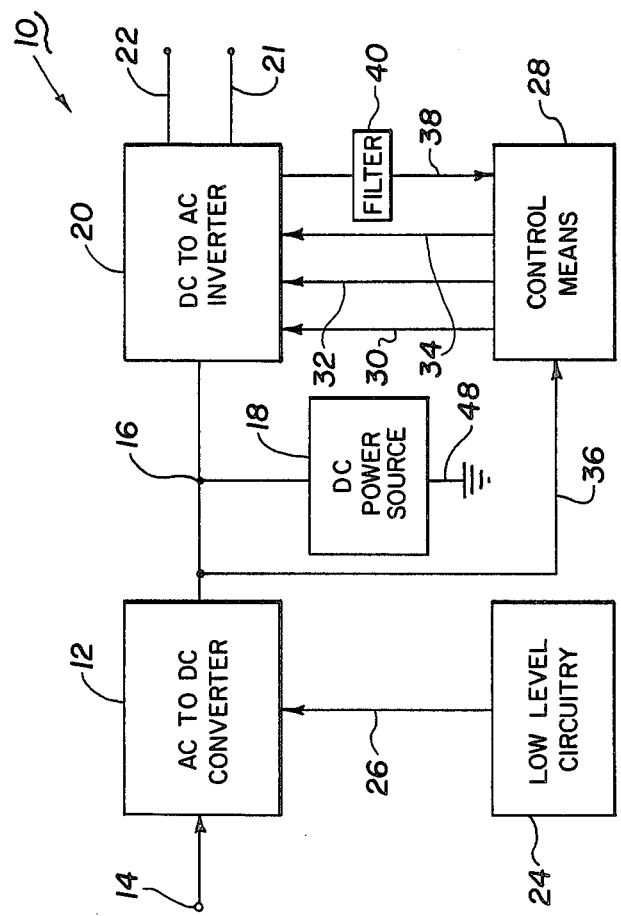
FIG. 1 is a simplified block diagram of the preferred embodiment of the present invention.

Referring now to the drawing wherein like reference numerals designate like or corresponding elements throughout the several views, the uninterruptible power supply apparatus is referred to generally by reference numeral 10. With reference to FIG. 1, uninterruptible power supply apparatus 10 comprises an ac to dc converter 12 which receives an ac input on input terminal 14 of one hundred twenty volts, sixty cycles and provides a regulated dc voltage to output terminal 16. In the preferred embodiment, the ac to dc converter 12 is a high frequency ac to dc buck converter. In the preferred embodiment, the regulated dc voltage out of the ac to dc converter 12 is approximately fifty-five volts. It will be appreciated that the output of the ac to dc converter 12 could be a different value depending upon the design thereof and the desired application.

The regulated dc voltage output from the ac to dc converter 12 is input to a dc power source 18 and a dc to ac inverter 20. In the preferred embodiment, the regulated dc voltage output from the ac to dc converter 12 is approximately fifty-five volts. In the preferred embodiment, the regulated dc voltage output from the ac to dc converter 12 float-charges the dc power source 18. In the preferred embodiment, dc power source 18 comprises a rechargeable forty-eight volt dc battery. It will be appreciated that if the apparatus is designed with a different value of output from the ac to dc converter 12, then the value of the dc power source 18 would also be changed.

The dc voltage at output terminal 16 is input to the dc to ac inverter 20 which provides an ac output across terminals 21 and 22 of one hundred twenty volts, sixty cycles which is available for application to equipment in which loss of power to the equipment is very undesirable.

Low level circuitry 24 generates the necessary control signals for proper operation of the ac to dc converter 12 and provides these control signals to the ac to dc converter 12 via cable 26.

Control means 28 generates the necessary control signals for proper operation of the dc to ac inverter 20 and provides these control signals to the dc to ac inverter 20 on leads 30, 32 and 34. Control means 28 receives input signals on leads 36 and 38. The input signal on lead 36 comprises the value of the dc voltage on output terminal 16 (or a representation thereof) and in the disclosed embodiment is referred to as the feed forward voltage. The input signal on lead 38 comprises a representation of the value or level of current in the dc to ac inverter 20 and is filtered by filter 40 prior to being input to control means 28. It will be appreciated that the above method is one method of accomplishing the desired results and that another suitable method would be a voltage feedback method.

Figure 2:
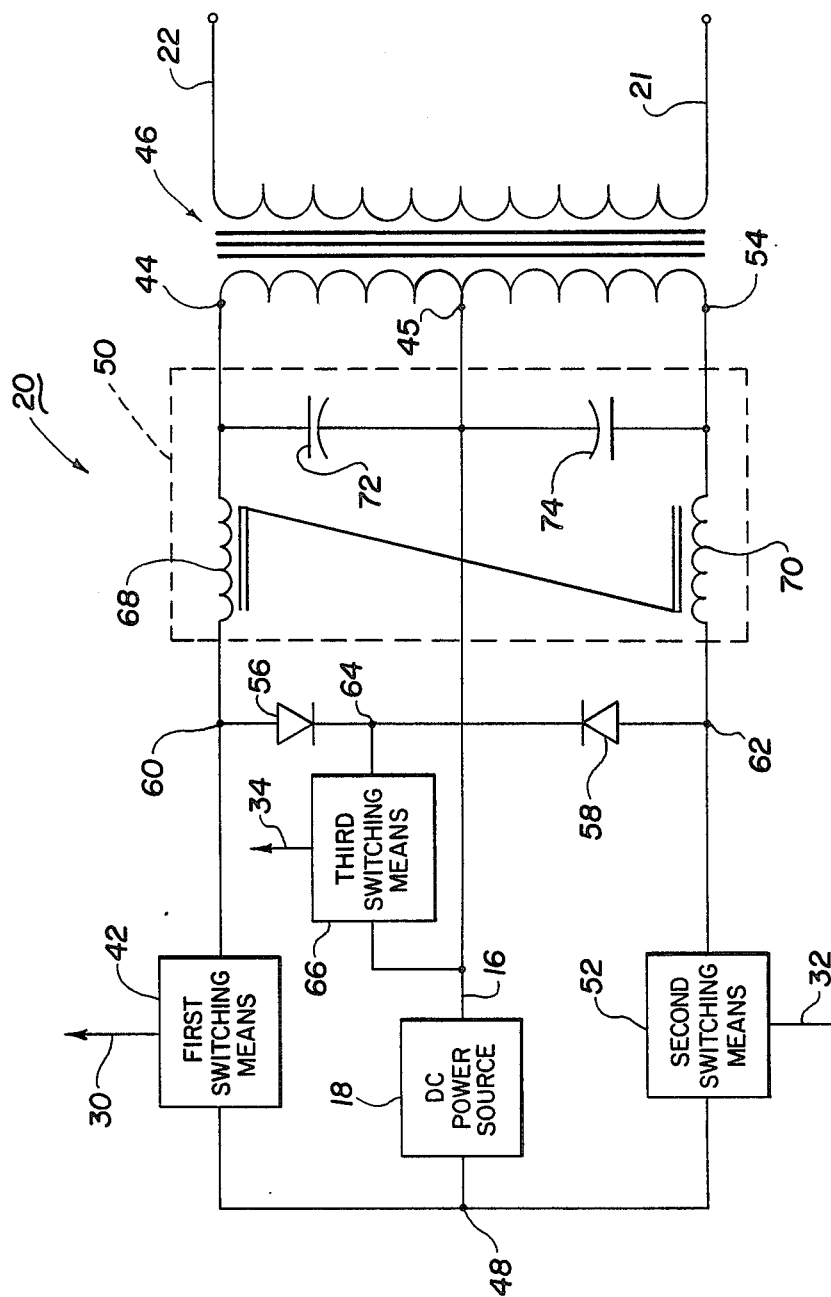
FIG. 2 is a simplified schematic diagram of the preferred embodiment of the dc to ac inverter of the present invention.

With reference to FIG. 2 which discloses a simplified schematic diagram of the preferred embodiment of the dc to ac inverter 20 and input dc power source 18, the dc to ac inverter 20 comprises first switching means 42 which is operatively connected between a first end 44 of the center-tapped primary of the output transformer 46 and the negative potential side or terminal 48 of dc power source 18. In the preferred embodiment, the connection is made through a predetermined portion of filter 50. Second switching means 52 is operatively connected between a second end 54 of the center-tapped primary of the output transformer 46 and the negative potential side or terminal 48 of dc power source 18. In the preferred embodiment, this connection being made through a predetermined portion of filter 50. Terminal 16 is connected to the center of the center-tapped primary of output transformer 46 at terminal 45. First rectifier means 56 and second rectifier means 58 are connected between terminals 60 and 62 with the cathodes of the rectifier means being connected at the common connection 64. Third switching means 66 is operatively connected between common connection 64 and the positive potential side or terminal 16 of dc power source 18. It will be appreciated that the regulated dc voltage output from the ac to dc converter 12 is also applied to terminal 16. In the preferred embodiment, first, second and third switching means 42, 52, and 66 are transistors and in particular are FET's. In the preferred embodiment, filter 50 comprises inductors 68 and 70 and capacitors 72 and 74. It will be appreciated that inductors 68 and 70 could be considered as one inductor with two windings. Inductors 68 and 70 are wound on the same core to reduce the leakage inductance to a very low value and thereby reduce the load on the third switching means 66. It will be appreciated that the capacitive function of capacitors 72 and 74 could be provided by a capacitive element across terminals 21 and 22.

Control means 28 provides the signals to the dc to ac inverter 20 which control the turn-on, the turn-off and the amount of time in between the turn-on and turn-off of the first, second and third switching means 42, 52 and 66. The control signals to the first switching means 42 are provided over lead 30. The control signals to the second switching means are provided over lead 32 while the control signals to the third switching means 66 are provided over lead 34. In the preferred embodiment, the control signals are substantially square wave pulses of predetermined varying widths which are generated in the control means by employing an EPROM programmed to generate a low level sine wave which is beat against a triangular waveform generated by appropriate circuitry in the control means 28.

With reference to FIG. 3, the power pulses 76 and associated filtered waveform 78 for one-half cycle of a sixty cycle ac signal are disclosed. Power pulses 76 result from the application of control pulse signals from control means 28 to the first switching means 42 via lead 30 and to the third switching means 66 via lead 34. The power pulses 76 represent the pulses of power which are applied across terminals 60 and 45 in FIG. 2 and also represent the shape of and relationship between the control pulses transmitted to the first switching means 42 on lead 30. The primary difference between the control pulses and the power pulses is amplitude or power and, of course, where the pulses are applied in the circuitry. Filtered waveform 78 represents the waveform of the signal resulting from filtering the pulse signals 76 by filter 50. The filtered waveform 78 is applied across first end 44 and terminal 45 of the center-tapped primary of the output transformer 46.

In the operation of the dc to ac inverter 20 (see FIG. 2) and the associated control means 28 for the one-half cycle disclosed in FIG. 3, a first control pulse of a predetermined width is sent via lead 30 to cause the first switching means 42 to turn on which results in the voltage of dc power source 18 to be applied across the upper half of the center-tapped primary of output transformer 46 and the connected portion of filter 50. At the termination or end of the first control pulse, the first switching means 42 is turned off and a second control pulse of a predetermined width is sent via lead 34 to cause the third switching means 66 to turn on which results in a short being applied across the upper half of the center-tapped primary of output transformer 46 and the connected portion of filter 50 through first rectifier means 56. At the termination or end of the second control pulse, the third switching means 55 is turned off and the short is removed. Then a third control pulse of a predetermined and different pulse width is sent via lead 30 to cause the first switching means 42 to turn on. When first switching means 42 turns off, then a fourth control pulse of a predetermined and different width is sent via lead 34 to cause the third switching means 66 to turn on, etc. So the turn-on and turn-off of the first switching means 42 and the third switching means 66 in an alternating pattern by control pulses of different widths continues for one-half of an ac sixty cycle sine wave. It will be appreciated that the width of the control pulses at the center of the one-half cycle are the greatest in width with the pulses decreasing in width toward the ends of the sixty cycle time period.

At the completion of the generation of the first half cycle, then the second half cycle is generated by alternating the turn-on and turn-off of the second switching means 52 and the third switching means 66 in relation to the lower half of the center-tapped primary of output transformer 46 in the same manner as was done with the first switching means 42 and the third switching means 66 to generate the first half cycle. First rectifier means 56 and second rectifier means 58 eliminate the need for two first switching means 42 and two second switching means 52. It will be appreciated that control means 28 may be made to vary the number and width of the control pulses depending upon the application and power drawn from the uninterruptible power supply apparatus 10.

When there is an interruption of the normally supplied ac power input on input terminal 14, dc power input to the dc to ac inverter 20 is maintained by the dc power source 18 and the ac power output across terminals 21 and 22 is not interrupted or disturbed. The equipment connected to and receiving ac power therefrom does not know that the primary ac power supplied to the uninterruptible power supply apparatus 10 has been interrupted.

During normal operation of the uninterruptible power supply apparatus 10, if the equipment attached to and being supplied power from terminals 21 and 22 causes an increase in the current being drawn from the dc to ac inverter 20, an indication of that increase in current is sent to control means 28 via lead 38. Control means 28 then adjusts (increases) the width of the control pulses being sent to the dc to ac inverter 20 to overcome the additional voltage drop caused by the increased current. However if there is a drop in the current demanded by the equipment load, then control means 28 would adjust and decrease the width of the control pulses being sent to the dc to ac inverter 20.

When the primary ac power supplied to the uninterruptible power supply apparatus 10 has been interrupted for a period of time which causes the voltage of the dc power source 18 to decrease, this occurrence is transmitted (feed forward voltage) to the control means 28 via lead 36. This feed forward voltage signal showing a decrease in the dc power source 18 causes the control means 28 to increase the width of the control pulses sent to the dc to ac inverter 20 so that the average or rms value, when filtered, will remain the same (within specification limits). Otherwise, the output of the dc to ac inverter 20 would change directly proportional to the voltage of the dc power source 18.

With reference to FIG. 4, exemplary control pulses and their relationship to each other with respect to the generation of the first half of the sixty cycle sine wave are disclosed. Control pulse 80 is sent to and controls first switching means 42 via lead 30 while control pulse 82 is sent to and controls third switching means 66 via lead 34. Control pulse 84 which is sent to and controls second switching means 52 via lead 32 is zero during the generation of the first half of the sixty cycle sine wave.

Thus, it is apparent that there has been provided in accordance with this invention, an uninterruptible power supply that substantially incorporates the advantages set forth above. The uninterruptible power supply apparatus provides a dependable means for supplying ac power to equipment even if and when the primary or utility ac power is interrupted.

Although the present invention has been described in conjunction with specific forms thereof, it is evident that many alternatives, modifications and variations will be apparent to those skilled in the art in light of the foregoing disclosure. Accordingly, this description is to be construed as illustrative only and is for the purpose of teaching those skilled in the art the manner of carrying out the invention. It is understood that the forms of the invention herewith shown and described are to be taken as the presently preferred embodiment. Various changes may be made in the shape, size and arrangement of parts. For example, equivalent elements may be substituted for those illustrated and described herein, parts may be reversed, and certain features of the invention may be utilized independently of other features of the invention. It will be appreciated that various modifications, alternatives, variations, etc., may be made without departing from the spirit and scope of the invention as defined in the appended claims.

We claim:

1. An uninterruptible power supply apparatus comprising:

an ac to dc converter structured to operatively receive an input of ac power and to provide a dc output;

means for providing a separate dc voltage source which is operatively connected to said dc output of said ac to dc converter;

a dc to ac inverter structured to operatively receive an input comprising the resultant dc output of the ac to dc converter and the dc voltage of the separate dc voltage source, said dc to ac inverter comprising:

an output transformer having a center-tapped primary winding and at least one secondary winding, a first switching means operatively connected between a first end of said center-tapped primary winding and the negative potential side of said input to said dc to ac inverter, a second switching means operatively connected between a second end of said center-tapped primary winding and the negative potential side of said input to said dc to ac inverter, a third switching means operatively connected between said first end of said center-tapped primary winding and the positive potential side of said input to said dc to ac inverter and also operatively connected between said second end of said center-tapped primary winding and the positive potential side of said input to said dc to ac inverter, connecting means operatively connecting the center-tap of said center-tapped primary winding to the positive potential side of said input to said dc to ac inverter, filter means comprising an inductive element operatively connected in series between said first end of said center-tapped primary winding and said first switching means, a capacitive element operatively connected between said first end of said center-tapped primary winding and the center-tap of said center-tapped primary winding, an inductive element operatively connected in series between said second end of said center-tapped primary winding and said second switching means and a capacitive element connected between said second end of said center-tapped primary winding and the center-tap of said center-tapped primary winding, and control means for providing control signals for controlling the turn-on and the turn-off of said first switching means, said second switching means and said third switching means at predetermined times, whereby the energizing pulses provided by the turn-on and the turn-off of the first, second and third switching means are smoothed by said filter means into a sine wave for application across said center-tapped primary winding of said output transformer to provide an AC sine wave voltage output across said secondary winding of said output transformer.

2. The apparatus of claim 1 further including a first rectifier means operatively connected between said first end of said center-tapped primary winding and said third switching means.

3. The apparatus of claim 2 further including a second rectifier means operatively connected between said second end of said center-tapped primary winding and said third switching means.

4. The apparatus of claim 1 wherein said first switching means comprises a transistor element.

5. The apparatus of claim 4 wherein said transistor element comprises an FET.

6. The apparatus of claim 1 wherein said second switching means comprises a transistor element.

7. The apparatus of claim 6 wherein said transistor element comprises an FET.

8. The apparatus of claim 1 wherein said third switching means comprises a transistor element.

9. The apparatus of claim 8 wherein said transistor element comprises an FET.

10. The apparatus of claim 1 wherein said control signals comprise square wave pulses of predetermined varying widths.

11. A dc to ac inverter comprising:

an output transformer having a center-tapped primary winding and at least one secondary winding, a first switching means operatively connected between a first end of said center-tapped primary winding and the negative potential side of a dc input to said dc to ac inverter, a second switching means operativley connected between a second end of said center-tapped primary winding and the negative potential side of the dc input to said dc to ac inverter, a third switching means operatively connected between said first end of said center-tapped primary winding and the positive potential side of the dc input to said dc to ac inverter and also operatively connected between said second end of said center-tapped primary winding and the positive potential side of the dc input to said dc to a inverter, connecting mens operatively connecting the center-tap of said center-tapped primary winding to the positive potential side of the dc input to said dc to ac inverter, filter means, comprising an inductive element operatively connected in series between said first end of said center-tapped primary winding and said first switching means, a capacitive element operatively connected between said first end of said center-tapped priamry winding and the center-tap of said center-tapped primary winding, an inductive element operatively connected in series between said second end of said center-tapped primary winding and said second switching means and a capacitive element connected between said second end of said center-tapped primary winding and the center-tap of said center-tapped primary winding, means operatively connected to said first switching means for receiving external control signals to control the turn-on and turn-off of said first switching means, means operatively connected to said second switching means for receiving external control signals to control the turn-on and turn-off of said second switching means, and means operatively connected to said third switching means for receiving external control signals to control the turn-on and turn-off of said third switching means, whereby the energizing pulses provided by the turn-on and turn-off of the first, second and third switching means are smoothed by said filter means into a sine wave for application across said center-tapped primary winding of said output transformer to provide an AC sine wave voltage output across said secondary winding of said output transformer.

12. The apparatus of claim 11 wherein said first switching means comprises a transistor element.

13. The apparatus of claim 12 wherein said transistor element comprises an FET.

14. The apparatus of claim 11 wherein said second switching means comprises a transistor element.

15. The apparatus of claim 14 wherein said transistor element comprises an FET.

16. The apparatus of claim 11 wherein said third switching means comprises a transistor element.

17. The apparatus of claim 16 wherein said transistor element comprises an FET.

18. A method of controlling a dc to ac inverter including an output transformer having a center-tapped primary winding and at least one secondary winding, a first switching means operatively connected between a first end of said center-tapped primary winding and the negative potential side of a dc input to the dc to ac inverter, a second switching means operatively connected between a second end of said center-tapped primary winding and the negative potential side of said dc input to said dc to ac inverter, a third switching means operatively connected between said first end of said center-tapped primary winding and the positive potential side of said dc input to said dc to ac inverter and also operatively connected between said second end of said center-tapped primary winding and the positive potential side of said dc input to said dc to ac inverter, connecting means operatively connecting the center-tap of said center-tapped primary winding to the positive potential side of said dc input to said dc to ac inverter, filter means operatively connected between said first end of said center-tapped primary winding and said first switching means and also operatively connected between said second end of said center-tapped primary winding and said second switching means, said method comprising the steps of:

(a) causing said first switching means to be placed in the "on" condition for a predetermined period of time thereby energizing one-half of said center-tapped primary;

(b) causing said first switching means to be placed in the "off" condition;

(c) causing said third switching means to be placed in the "on" condition for a predetermined period of time thereby placing a short across the one-half of said center-tapped primary which had been energized in step (a) above;

(d) repeating steps (a) through (c) for a predetermined period of time;

(e) causing said second switching means to be placed in the "on" condition for a predetermined period of time thereby energizing the remaining one-half of the center-tapped primary;

(f) causing said second switching means to be placed in the "off" condition;

(g) causing said third switching means to be placed in the "on" condition for a predetermined period of time thereby placing a short across the one-half of said center-tapped primary which had been energized in step (e) above;

(h) repeating steps (e) through (g) for a predetermined period of time.

* * * * *

UNITED STATES PATENT AND TRADEMARK OFFICE
CERTIFICATE OF CORRECTION

PATENT NO. : 4,780,801

DATED : October 25, 1988

INVENTOR(S) : Frank H. Gill, et al.

It is certified that error appears in the above-identified patent and that said Letters Patent is hereby corrected as shown below:

```
Column 2, line 49,   "present," should read ---present---
Column 7, line 56,   "a" should read ---ac---
Column 7, line 57,   "mens" should read ---means---
Column 7, line 66,   "priamry" should read ---primary---
```

Signed and Sealed this

Fourteenth Day of March, 1989

Attest:

DONALD J. QUIGG

Attesting Officer     Commissioner of Patents and Trademarks